(12) United States Patent
Finkenzeller et al.

(10) Patent No.: US 10,260,571 B2
(45) Date of Patent: Apr. 16, 2019

(54) CLUTCH DEVICE WITH EDDY CURRENT BRAKE WITH REDUCED AIR GAP

(71) Applicant: Schaeffler Technologies AG & Co. KG, Herzogenaurach (DE)

(72) Inventors: Marc Finkenzeller, Gengenbach (DE); Daniel Helmer, Ottenhoefen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 198 days.

(21) Appl. No.: 15/308,757

(22) PCT Filed: Apr. 16, 2015

(86) PCT No.: PCT/DE2015/200259
§ 371 (c)(1),
(2) Date: Nov. 3, 2016

(87) PCT Pub. No.: WO2015/169308
PCT Pub. Date: Nov. 12, 2015

(65) Prior Publication Data
US 2017/0191533 A1 Jul. 6, 2017

(30) Foreign Application Priority Data
May 9, 2014 (DE) .......... 10 2014 208 697

(51) Int. Cl.
*F16D 27/00* (2006.01)
*F16D 27/02* (2006.01)

(52) U.S. Cl.
CPC ........ *F16D 27/02* (2013.01); *F16D 2027/008* (2013.01); *F16D 2250/0084* (2013.01)

(58) Field of Classification Search
CPC ............. F16D 27/02; F16D 2250/0084; F16D 2027/008
See application file for complete search history.

(56) References Cited

U.S. PATENT DOCUMENTS 2,563,424 A 8/1951 Sampietro
2,965,777 A 12/1960 Jaeschke
(Continued)

FOREIGN PATENT DOCUMENTS

CN 2906200 Y 5/2007
CN 103683645 A 3/2014
(Continued)

OTHER PUBLICATIONS

First Office Action for Chinese Application No. 201580024310.X dated Apr. 20, 2018, 6 pages.

*Primary Examiner* — David J Hlavka
(74) *Attorney, Agent, or Firm* — Brooks Kushman P.C.

(57) ABSTRACT

The invention comprises a clutch device having an actuating device, wherein the actuating device has an electrical eddy current brake. The eddy current brake has a brake stator with at least one coil and a brake rotor with a brake region, wherein the brake region has a first layer which is electrically conductive and which has a first lateral face and a second lateral face, the first lateral face facing toward the coil and the second lateral face facing away from the coil. The brake region has a second layer which is magnetic and which is connected to the second lateral face. The invention further comprises a corresponding production method.

10 Claims, 2 Drawing Sheets

(56) References Cited

U.S. PATENT DOCUMENTS

| | | | | |
|---|---|---|---|---|
| 3,327,822 A | * | 6/1967 | Spencer | F16D 27/118 192/18 B |
| 5,687,822 A | * | 11/1997 | Arai | F16D 27/105 192/81 C |
| 9,866,088 B1 | * | 1/2018 | Hauser | H02K 7/114 |
| 2004/0256192 A1 | * | 12/2004 | Hill | F16D 27/112 192/84.31 |
| 2007/0096574 A1 | * | 5/2007 | Romagny | B60K 6/26 310/112 |
| 2011/0005887 A1 | * | 1/2011 | Krafft | F16D 27/112 192/84.1 |
| 2015/0034447 A1 | * | 2/2015 | Wang | F16D 43/18 192/84.8 |
| 2018/0119753 A1 | * | 5/2018 | Rippelmeyer | F16D 27/14 |

FOREIGN PATENT DOCUMENTS

| | | |
|---|---|---|
| DE | 3443523 A1 | 6/1986 |
| DE | 102012222830 | 6/2013 |
| WO | WO2015070856 | 5/2015 |

\* cited by examiner

CLUTCH DEVICE WITH EDDY CURRENT BRAKE WITH REDUCED AIR GAP

CROSS-REFERENCE TO RELATED APPLICATIONS

The present application is the United States National Stage application pursuant to 35 U.S.C. § 371 of International Patent Application No. PCT/DE2015/200259, filed on Apr. 16, 2015, and claims priority to German Patent Application No. DE 10 2014 208 697.3 of May 9, 2014, which applications are incorporated by reference in their entireties.

FIELD

The invention relates to an eddy current brake for a clutch device, more specifically to an eddy current brake including a brake rotor having an electrically conductive brake region which is movable in a magnetic field formed by a coil.

BACKGROUND

Electromechanical and electrohydraulic clutch actuating systems are known, for example, for clutch by wire (CBW) applications. Actuators of the respective different type (electromechanical/electrohydraulic) are used specifically for this, which have in each case, drive systems adapted to the actuator. This requires appropriate effort for development but also in other areas, such as for example, design, production, parts support, parts management, or warehousing.

In hybrid vehicles, an internal combustion engine and an electric drive motor are frequently provided to propel the hybrid vehicle. The hybrid vehicle may be propelled either only by the internal combustion engine, only by the electric drive motor, or by both. In order to start the internal combustion engine during purely electric driving operation or to couple it to the drivetrain, a clutch device is provided which includes an electric actuator, for example, an eddy current brake. The eddy current brake includes an electrically conductive brake region, for example a metal disk, which is movable in a controllable magnetic field, which is producible by a coil. As the magnetic disk moves in the magnetic field voltages are produced in it by induction, resulting in eddy currents, which in turn produce magnetic currents of their own contrary to the external magnetic field, which slow down the electrically conductive area. This sets the torque characteristic curve of the clutch.

Such a clutch with electric actuator is disclosed in DE 10 2012 222 830 A1.

Such a clutch with eddy current brake is disclosed in German patent application DE 10 2013 223 044.3. The eddy current brake there has a central coil, and the special construction, in which the coil is positioned opposite only one lateral face of the metal brake disk, provides for a very space-saving configuration of the coil arrangement and at the same time a large effective eddy current area.

The inventors have undertaken the task of increasing the reliability of the clutch device of the prior art.

SUMMARY

To reduce at least part of this effort, it is proposed to use one and the same electric motor (including electronics) for both electromechanical and electrohydraulic clutch actuation. Accordingly, this electric motor is intended as a module for at least the two enumerated actuator variants.

The object is fulfilled in particular by a clutch device having an actuating device, wherein the actuating device has an electrical eddy current brake, wherein the eddy current brake has a brake stator with at least one coil and a brake rotor with a brake region, wherein the brake region has a first layer which is electrically conductive and which has a first lateral face and a second lateral face, the first lateral face facing toward the coil and the second lateral face facing away from the coil, and wherein the brake region has a second layer which is magnetic and which is connected to the second lateral face.

The object is further fulfilled by a method for producing a clutch device having an actuating device, wherein the actuating device has an electrical eddy current brake, wherein a brake stator with at least one coil and a brake rotor with a brake region are built into the eddy current brake, wherein the brake region is designed with a first layer which is electrically conductive and which has a first lateral face and a second lateral face, the first lateral face being positioned facing toward the coil and the second lateral face being positioned facing away from the coil, wherein the brake region is designed with a second layer which is magnetic and which is connected to the second lateral face.

As a result, it is possible on the one hand to continue to retain a compact construction form. On the other hand, at the same time it is possible to minimize the existing air gaps in comparison to the prior art. Thus, it is now possible to enlarge an air gap that is present between the back or the second layer and the adjacent component, for example, a part of the brake stator, since the magnetic circuit now no longer has to close primarily across this air gap. This prevents malfunctioning due to contact of the brake rotor with the corresponding adjacent component. Because of the second layer located on the second lateral face, the magnetic circuit can now close advantageously already in the brake stator, and the magnetic field does not run across a second air gap between two components that move relative to one another. Thus, the thickness of the path of the magnetic field through air gaps is reduced overall, and the magnetic flux density and with it the braking torque of the eddy current brake is therefore increased. Furthermore, the heat capacity of the brake rotor is increased by the second layer, so that the brake rotor heats up less as a braking torque is generated (for example, to start the engine, or to couple the combustion engine in deceleration mode).

The clutch device is preferably a clutch device for a drivetrain of a motor vehicle, where the drivetrain has a combustion engine, an electric machine with a stator and a rotor, and a transmission device, wherein the clutch device is positioned in the drivetrain between the combustion engine on the one side and the electric machine and the transmission device on the other side. The clutch device is set up in the drivetrain of a hybrid vehicle, in particular, to start and/or engage the combustion engine. It is, by particular preference, a disconnect clutch (a so-called e-clutch) for a hybrid drivetrain. It is preferably a dry, multi-plate clutch. It is preferably integrated into a rotor of the electric machine of the drivetrain. The disconnect clutch is preferably set up to couple the combustion engine to the drivetrain or to decouple it from the drivetrain. Except for the design of the eddy current brake with two layers according to the invention, the clutch device is preferably identical to the clutch disclosed in German patent application 10 2013 223 044.3, in particular the clutch shown in FIG. 2.

The eddy current brake is preferably set up to produce a pilot torque from a rotation of the rotor from the electric machine. The pilot torque is preferably transformed by the actuating device into a (partial) engagement of the clutch device. The production of the pilot torque by the eddy current brake makes rapid activation of the internal combustion engine possible, while the eddy current brake works without wear.

The actuating device is preferably set up to disengage and engage the clutch. The actuating device preferably has two ramps which are rotatable toward one another, by means of which an axial displacement of a contact plate relative to a pressure plate of the clutch device can be performed by rotating. The actuating device preferably has a planetary gear set, on which the eddy current brake acts. This planetary gear set amplifies the pilot torque produced by the eddy current brake, and therefore increases the effect of the eddy current brake.

For example, when operating under purely electric motor propulsion, the disconnect clutch is disengaged, so that the combustion engine is uncoupled from the drivetrain. If more power is required, or if the electrical energy reserve is running out, the combustion engine is started by partially engaging the disconnect clutch, while the disconnect clutch goes into deceleration mode. The eddy current brake is preferably engaged to this end, so that within the disconnect clutch the eddy current brake slows one of the ramps, so that a speed difference of the rotatable ramps occurs, as a result of which the disconnect clutch at least partially engages. This causes the combustion engine to be started by the electric motor. When the combustion engine is turning faster than the electric motor (that is, it is transitioning to traction mode), a freewheel mechanism closes, which causes the disconnect clutch to become completely engaged. When the freewheel mechanism closes in traction mode, the combustion engine transmits part of its torque through an additional sun gear, which is connected to the freewheel mechanism, as well as the planetary gears and ring gear of a planetary gear set, to the ramp on the ring gear side, so that the disconnect clutch is completely engaged and is then able to transmit the entire torque of the combustion machine in traction mode. When the eddy current brake is opened, the clutch is disengaged, for example, by leaf or coil springs which were pre-tensioned while it was being engaged. The combustion engine is preferably turned off during or after the disengagement process.

The brake stator is preferably a component which is rotatable relative to the brake rotor. It preferably has a central coil as its only coil. The central coil preferably has a rotationally symmetrical shape, preferably concentric to the axis of rotation of the eddy current brake. The brake stator preferably has a first claw pole with first pole claws and a second claw pole with second pole claws. The central coil is preferably surrounded by the first claw pole with its first pole claws and the second claw pole with its second pole claws.

The first claw pole preferably has a disk segment. The disk segment preferably has a radially outer rim. The first pole claws are preferably positioned on the radially outer rim of the disk segment. The first pole claws are preferably at least partially angled approximately perpendicular to the disk segment of the first claw pole. The first pole claws are preferably distributed around the disk segment of the first claw pole in the circumferential direction. Gaps are preferably formed between the first pole claws.

The second claw pole preferably has a disk segment. The disk segment preferably has a radially outer rim. The second pole claws are preferably positioned on the radially outer rim of the disk segment. The second pole claws are preferably at least partially angled approximately perpendicular to the disk segment of the first claw pole. The second pole claws are preferably distributed around the disk segment of the second claw pole in the circumferential direction. Gaps are preferably formed between the second pole claws.

The first claw pole and the second claw pole are preferably positioned with their disk segments parallel to one another and spaced apart from one another. The first pole claws and/or the second pole claws preferably each have one free end. The first claw pole and the second claw pole are preferably positioned so that the free ends of the first pole claws and the free ends of the second pole claws are directed toward one another. The first pole claws and the second pole claws preferably each mesh alternately with one another. The first pole claws preferably reach into the gaps formed between the second pole claws. The second pole claws preferably reach into the gaps formed between the second pole claws. The free ends of the first pole claws and/or the free ends of the second pole claws are preferably designed so that they taper from wide to narrow.

The brake stator preferably has an internal stator which has the (central) coil and preferably the claw poles, and the brake rotor is positioned at least partially radially outside of the internal stator.

The brake stator is preferably a component which is rotatable relative to the brake stator.

In the brake region of the brake rotor, the eddy currents are producible by a magnetic field coming from the brake stator. The brake region is preferably a cylindrical and/or disk-shaped partial region of the brake rotor.

The brake rotor is preferably of disk-shaped design, by particular preference cup-like; that is, it has a radially extending, preferably disk-shaped section or floor section and an axially extending, preferably cylindrical section or wall section. It may be a single piece or multiple pieces. The brake region is part of the radially extending section and/or of the axially extending section, or the radially extending section and/or the axially extending section are formed by the brake region. By particular preference, the brake region is located at least partially radially outside of the internal stator. For example, the brake rotor has a cup-like shape with a wall section as the brake region, and the wall section is located radially outside of the internal stator. The internal stator preferably has pole claws which are located directly opposite the brake region and are spaced apart from it by an air gap. The brake rotor preferably also has a floor section, and with this floor section is positioned on the disk segment of the second claw pole with an interval between them, the floor section and disk segment preferably being positioned parallel to one another.

The first layer (which may also be referred to as the first material layer) preferably has a maximum thickness of 10 mm, preferably 5 mm, by particular preference 1 mm. By particular preference, it has a constant thickness (essentially, for example with a tolerance of ±0.1 mm). From the mechanical and thermal perspectives, the greatest possible material thickness (5-10 mm) should be chosen. In addition, the resistance decreases (larger cross section) at the greatest possible material thickness, which enables the position of the maximum torque to be optimized. However, the real thickness is influenced chiefly by the choice of material. If it is a ferromagnetic material (such as iron), then the increasing thickness has no influence on the air gap in the magnetic circuit (the air gap corresponds merely to the optically recognizable air gap between magnetic pole and electrically conductive material. On the other hand, if a paramagnetic material (such as aluminum or nickel) or a diamagnetic material (such as copper) is used, the air gap increases as the material thickness increases, since the disk material has the same permeability as air (the air gap corresponds to the optically recognizable air gap plus the thickness of the electrically conductive material. An expanding air gap affects the magnetic field negatively, since the magnetic resistance increases and thus the flux density in the air gap decreases while the magnetic geometry otherwise remains the same. This, in turn, results in reduced braking torque of the eddy current brake. For this reason, the material thickness generally falls within the range of 1-3 mm for paramagnetic and diamagnetic materials.

The first layer preferably consists of a (first) material, which is electrically conductive, so that the eddy currents can form in it advantageously. It is preferably a most highly electrically conductive material. The material preferably has an electrical conductivity of more than $15 \cdot 10^6$ S/m, by particular preference more than $30 \cdot 10^6$ S/m (in each case at a temperature of 300K). For example, the first material is preferably iron, tungsten, or nickel. By particular preference, the first material is brass, copper, or aluminum. The electrically conductive material is generally chosen with regard to the geometric dimensions of the disk and the resulting speed of the "moving conductor," as well as the desired speed of rotation and effective range of the eddy current brake. As the specific electric resistance increases, the maximum braking torque is reached only at a higher relative speed. Applications having a small effective radius of the electrically conductive material and the position of maximum torque at low speeds of rotation thus require a material with a low specific electric resistance (such as copper or aluminum). On the other hand, if the effective radius is larger and the maximum torque is to be reached only at a greater disk speed, then a material having a greater electric resistance (such as steel) is adequate.

The first and second lateral faces of the first layer are preferably two boundary surfaces of the first layer which are preferably essentially parallel to one another. In the case of a cylindrical brake region, these are, for example, an inner and an outer circumferential surface, in the case of a disk-shaped brake region, a front axial surface and a back axial surface.

The first lateral face faces toward the coil and the second lateral face faces away from the coil. For example, it is preferred that the coil, by particular preference, the center point of the coil, is at a smaller minimum distance from the first lateral face than from the second lateral face. As a result, because of a current flowing through the coil, two magnetic poles are formable which are both located on one side of the brake region, i.e., close to that side, so that the magnetic fields of both poles, starting from the respective pole, first penetrate the first lateral face and only then the second lateral face of the first layer of the brake region. This forces a closure of the magnetic circuit from the perspective of the coil beyond the first layer of the brake region, so that as a result a magnetic field line must pass through the first layer of the brake region twice, which results in even more efficient eddy current generation.

The second layer (which may also be referred to as the second material layer) preferably has a minimum thickness of 10 mm, preferably more than 5 mm, by particular preference more than 1 mm. By particular preference, it has a constant thickness (essentially, for example with a tolerance of ±0.1 mm). By particular preference, material thickness is position-dependent. In principle, it is to be fixed such that in the entire magnetic circuit a constant flux density results—at a maximum electric coil power close to the saturation polarization of the material used. This results in a best possible material utilization and can be achieved very simply, for example by means of sintered components. On the other hand, if the claw poles are formed from sheet metal, then it must be kept in mind that the greatest flux density occurs in the area of the poles. As can be seen from FIG. 2, the poles are also tapered to a point, so that in the air gap a constant magnetic field develops over the entire breadth.

The second layer is magnetic, so that the magnetic circuit is able to close in it advantageously. The layer preferably consists of a (second) material having the highest magnetic permeability, by particular preference a ferromagnetic material. It preferably has a relative permeability μr of at least 200, preferably at least 2000. The second layer preferably consists of iron (of the highest possible purity), low-alloy steel or some other alloy such as mu metal or a Fe—Si alloy.

The second layer is preferably non-rotating in relation to the first layer. The second layer is preferably non-rotatably connected to the second lateral face of the first layer. The second layer is preferably non-rotatably connected to the brake rotor. Preferably, the first layer is positioned between the second layer and the first lateral face of the first layer. Preferably, the second layer is attached to the second lateral face of the first layer, or the first layer is attached to the second layer by means of the second lateral face of the first layer. The one layer is preferably welded, screwed or especially pressed onto the other layer. The second layer is preferably continuously present in the brake region in the circumferential direction of the brake rotor. The second layer is preferably point-symmetric in reference to a point on the axis of rotation of the brake rotor.

In another clutch device according to the invention, the brake region is at least partially cylindrical and the second layer is made of a ring-shaped material.

This makes an advantageous arrangement of the brake region possible in an area located radially far outside relative to the total radial extension of the eddy current brake, which increases the braking torque, since on the one hand the area of the brake region is larger and on the other hand the distance from the axis of rotation.

The brake rotor preferably has a cup-like component of an electrically conductive material, with the wall region of this component being part of the brake region. This wall region is cylindrical, and the ring-type pre-formed second layer is attached to this wall region on the outside (in the case of an internal stator).

In another clutch device according to the invention, the second layer is attached to the second lateral face by means of a press fit. In another method according to the invention, the second layer is attached to the second lateral face by means of a pressing process.

This achieves a uniformly adhering, easily realizable attachment of the second layer. Preferably the ring-type pre-shaped second layer is pressed onto the wall region of the cup-like component of the rotor on the outside (in the case of an internal stator).

In another method according to the invention, the second layer is pre-formed in a ring shape and the pressing procedure includes pressing the ring-type pre-formed second layer onto a cylindrical wall region of the brake rotor.

In another clutch device according to the invention, the second layer is positioned radially outside of the first layer and the brake stator has an internal stator which contains the coil.

Thus the coil is located radially inside the first layer. This achieves an especially compact construction, in which the brake region in addition may have a large radius, so that the braking torque is very advantageous.

In another clutch device according to the invention, there is a minimal air gap present between the internal stator and the first layer, which is smaller than a minimal air gap between the second layer and a stator component adjacent to the second layer.

This spaces the brake rotor apart from the internal stator with the smallest air gap. This is possible because other air gaps lose influence, as the magnetic circuit can already close in the second layer. Through the provision of larger distances or air gaps relative to the second layer or other stator components, malfunctions resulting from contact of the rotor with external components of the stator can be prevented.

A stator component is a component which is rotatable relative to the brake rotor. It may be part of an internal stator or an external stator, preferably an external stator.

A minimal air gap is preferably understood to mean the air gap between two components at the location of the smallest distance between these parts.

In another clutch device according to the invention, the extension of the second layer is greater in the axial direction than in the radial direction.

This achieves an especially large-area extension of the second layer perpendicular to the operative magnetic field, and thus greater efficiency.

In another clutch device according to the invention the second layer is thicker than the first layer.

Preferably the ratio of the thickness of the second layer to the first layer is in the range from greater than 1:1 up to and including 1.5:1, preferably greater than 1.5:1, especially preferably greater than or equal to 2:1, by particular preference greater than or equal to 4:1. In each case, this yields advantageous relationships of magnetic permeability and electrical conductivity of the brake region. In practical application, layer thickness ratios of 1:1-1.5:1 achieve a sufficiently advantageous effect.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
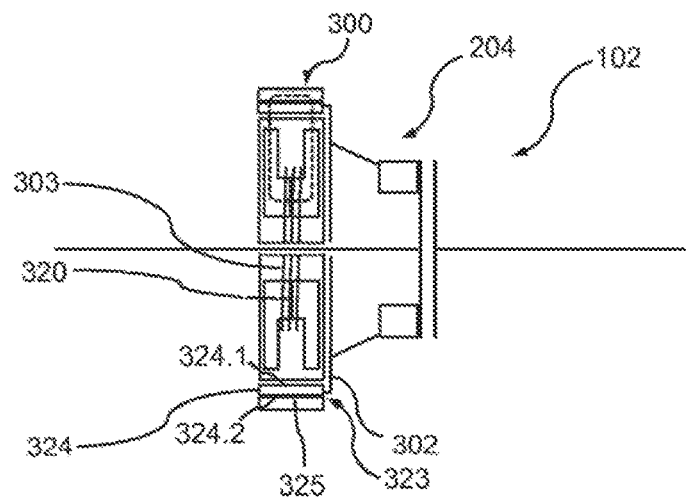
FIG. 1 is a schematic diagram of a clutch device according to the invention with a current eddy brake.

FIG. 1 shows a clutch device 102 according to the invention with eddy current brake 300. The clutch device 102 has an actuating device 204, which in turn has an eddy current brake 300. The eddy current brake 300 has a brake stator 303 having at least one coil 320 and a brake rotor 302 having a brake region 323. The brake region 323 has a first layer 324, which is electrically conductive and which has a first lateral face 324.1 and a second lateral face 324.2. The first lateral face 324.1 faces toward the coil 320 and the second lateral face 324.2 faces away from the coil 320. The brake region 323 has a second layer 325, which is magnetic and which is connected to the second lateral face 324.2.

During operation of the clutch device 102, by activating the eddy current brake 300, i.e., by applying current to the coil 320, a magnetic field is generated which produces eddy currents in the first layer 324. Through the second layer 325, the magnetic circuit (dashed line) closes in the second layer 325 and thus already in the brake rotor 302.

This avoids, in particular, the magnetic field from having to pass through yet another air gap, for example to an outer stator. Thus, the distance from the external stator or some other component in the vicinity of the brake rotor 302 can be enlarged and therefore the operational reliability increased. Furthermore, the brake rotor 302 gains heat capacity, which guards better against overheating, and efficiency is achieved due to the smaller air gap distance of the magnetic circuit.

Figure 2:
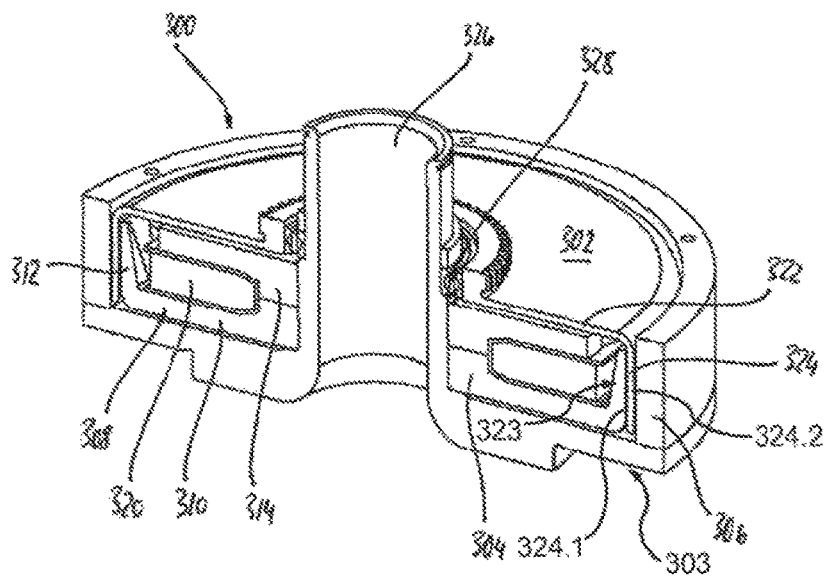
FIG. 2 is a perspective sectional view of the eddy current brake according to the prior art.

FIG. 2 shows a perspective sectional view of the eddy current brake 300 according to the prior art. It has a brake stator 303 and a brake rotor 302. The brake stator 303 has an internal stator 304 and an external stator 306. At this point we refer to FIG. 4 of German patent application 10 2013 223 044.3, whose reference labels continue to be used and which shows the internal stator 304 in greater detail. The internal stator 304 has a first claw pole 308 having a disk segment 310 and pole claws, such as 312. The internal stator 304 has a second claw pole 314 having a disk segment 316 and pole claws, such as 318. The internal stator 304 has a central coil 320. The pole claws 312 of the first claw pole 308 are located on the radially outer side of the disk segment 310. The pole claws 312 of the first claw pole 308 are each angled at about 90° to the disk segment 310, and each have a free end tapering from wide to narrow. The pole claws 312 of the first claw pole 308 are distributed around the disk segment 310 in the circumferential direction. There are gaps between the pole claws 312 of the first claw pole 308. The pole claws 318 of the second claw pole 314 are located on the radially outer side of the disk segment 316. The pole claws 318 of the second claw pole 314 are each angled at about 90° to the disk segment 316, and each have a free end tapering from wide to narrow. The pole claws 318 of the second claw pole 314 are distributed around the disk segment 316 in the circumferential direction. There are gaps between the pole claws 318 of the second claw pole 314. The first claw pole 308 with its disk segment 310 and the second claw pole 314 with its disk segment 316 are positioned on both sides of the central coil 320. The pole claws 312 of the first claw pole 308 and the pole claws 318 of the second claw pole 314 surround and grip the central coil 320 radially on the outer side. The free ends of the pole claws 312 of the first claw pole 308 and the free ends of the pole claws 318 of the second claw pole 314 face toward one another. The pole claws 312 of the first claw pole 308 and the pole claws 318 of the second claw pole 314 mesh alternately with one another. The first claw pole 308 and the second claw pole 314 surround and grip the central coil 320 radially on the inside. The brake rotor 302 has a cup-like shape with a floor section 322 and a brake region with wall section and first layer 324. The brake rotor 302 is positioned with its floor section 322 on the second claw pole 314 and with its wall section positioned with the first layer 324 radially on the outer side of the internal stator 304. The external stator 306 is of coil-free design, and has a thin, flat ring-shaped form. The external stator 306 is magnetically permeable. The external stator 306 is positioned radially on the outer side of the brake rotor 302. The internal stator 304 and the external stator 306 are firmly connected to a supporting part 326. The supporting part 326 has a flange section and a hub section. The supporting part 326 and the external stator 306 form a housing-like receptacle for the internal stator 304 and the brake rotor 302. The first claw pole 308 is located on the flange section of the supporting part 326. The hub section of the supporting part 326 protrudes through a central cutout in the internal stator 304. The brake rotor 302 is supported rotatingly on the hub section of the supporting part 326 with the help of a bearing 328.

An eddy current brake 300 of this type has an air gap between the external stator 306 and the first layer 324, and the magnetic circuit must close in addition across this air gap.

Figure 3A:
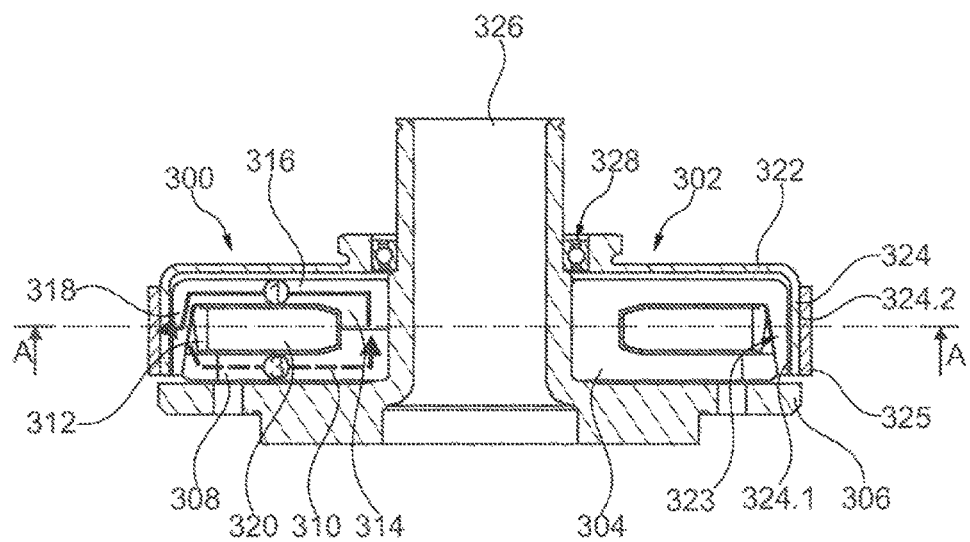
FIG. 3a is a sectional view of an eddy current brake according to the invention; and, FIG. 3b is a sectional view along A-A of the eddy current brake according to the invention from FIG. 3.
Figure 3B:
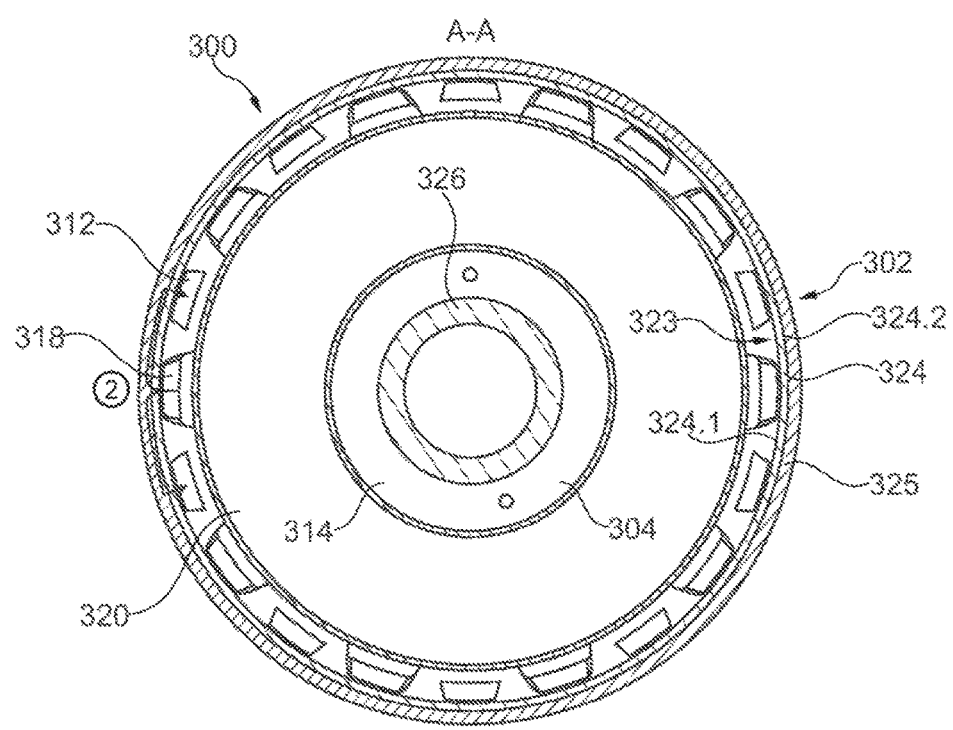

FIG. 3a shows a sectional view along A-A of an eddy current brake 300 according to the invention, and FIG. 3b shows a sectional view of the eddy current brake according to the invention from FIG. 3. This eddy current brake builds on FIG. 1 and FIG. 2. In contrast to the eddy current brake 300 from FIG. 2, the brake rotor 302 has a second layer 325 in the brake region 323, i.e., here in the wall section having the first layer 324, and an external stator 306 is not absolutely necessary. In other respects it has preferably the same features as the eddy current brake 300 from FIG. 2 and FIG. 1. Furthermore, the brake region 323 is at least partially cylindrical and the second layer 325 is made of a ring-shaped material. The second layer 325 is attached to the second lateral face 324.2 by means of a press fit. The second layer 324.2 is located radially outside of the first layer 324.1, and the brake stator 303 has an internal stator 304 which contains the coil 320. There is a minimal air gap present between the internal stator 304 and the first layer 324, which is smaller than a minimal air gap between the second layer 325 and a stator component adjacent to the second layer 325. The extension of the second layer 325 is greater in the axial direction than in the radial direction. The second layer 325 is thicker than the first layer 324.

During operation of the clutch device, the magnetic circuit runs along the indicated path from ①︎ through ②︎ to ③︎. From a pole claw 318 of the second claw pole 314 here it runs across the air gap between the internal stator 304 and the first layer 324 of the brake rotor 302. It penetrates the first layer 324 (see ①︎) and passes over into the second layer 325, where it runs tangentially divided in the direction of the two adjacent pole claws 312 of the first claw pole 308 (see ②︎) and back again through the first layer 324, the air gap between internal stator 304 and the first layer 324 (see ③︎) into the first claw pole 308.

Hence, the magnetic circuit now runs only across an air gap, instead of—as in FIG. 2—also imperatively across the air gap between the external stator 306 and the brake rotor 302. The reliability is thus increased, and in addition also the efficiency, since it is possible to dispense with keeping the distance between an external stator or similar component small and since the thermal capacity is higher.

With this invention, a clutch device having an eddy current brake with a reduced air gap has been presented. In this case, the magnetic circuit is not closed via the external stator, as in the past, but via an additional layer (e.g., ring-shaped) which rotates together with the brake rotor (for example a brake disk). This layer is preferably of a material having the highest possible permeability, and is pressed directly onto the eddy current ring. This arrangement makes it possible to prevent a malfunction due to the rotor and the external stator touching. Because of the reduced air gap, the magnetic flux density in the air gap and thus the braking torque of the eddy current brake continue to be increased. In addition, this variant has the advantage that the thermal mass of the disk is increased, and thus the latter heats up less when generating the braking torque for starting the motor (e.g., in deceleration mode to couple the combustion engine).

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE LABELS 102 clutch device
204 actuating device
300 eddy current brake
302 brake rotor
303 brake stator
304 internal stator
306 external stator
308 first claw pole
310 disk segment
312 pole claw
314 second claw pole
316 disk segment
318 pole claw
320 central coil
322 floor section
323 brake region
324 first layer
324.1 first lateral face
324.2 second lateral face
325 second layer
326 supporting part
328 bearing

What is claimed is:

1. A clutch device comprising:
an actuating device, wherein the actuating device includes an electrical eddy current brake, wherein the eddy current brake includes a brake stator with at least one coil and a brake rotor with a brake region, wherein the brake region includes a first layer which is electrically conductive and which includes a first lateral face and a second lateral face, the first lateral face facing toward the at least one coil and the second lateral face facing away from the at least one coil, wherein the brake region includes a second layer which is magnetic and which is connected to the second lateral face.

2. A clutch device as recited in claim 1, wherein the brake region is at least partially cylindrical and the second layer is made of a ring-shaped material.

3. A clutch device as recited in claim 2, wherein the second layer is attached to the second lateral face.

4. A clutch device as recited in claim 3, wherein the second layer is located radially outside of the first layer, and the brake stator comprises an internal stator which contains the at least one coil.

5. A clutch device as recited in claim 4, wherein there is a first minimal air gap present between the internal stator and the first layer, which is smaller than a second minimal air gap between the second layer and a stator component adjacent to the second layer.

6. A clutch device as recited in claim 5, wherein an extension of the second layer is greater in an axial direction than in a radial direction.

7. A clutch device as recited in claim 6, wherein the second layer is thicker than the first layer.

8. A clutch device comprising:
an actuating device, wherein the actuating device includes an electrical eddy current brake that includes a brake stator with at least one coil and a brake rotor with a brake region, wherein the brake region includes a first layer which is electrically conductive and which includes a first lateral face and a second lateral face, the first lateral face being positioned facing toward the coil and the second lateral face being positioned facing away from the coil, wherein the brake region includes a second layer which is magnetic and connected to the second lateral face.

9. The clutch device of claim 8, wherein the second layer is attached to the second lateral face.

10. The clutch device of claim 9, wherein the second layer is pre-shaped in a ring form.

* * * * *